United States Patent

Taguchi

[19]

[11] Patent Number: 6,163,784

[45] Date of Patent: *Dec. 19, 2000

[54] METHOD AND APPARATUS FOR OUTPUTTING AN IMAGE OF A TABBED DOCUMENT

[75] Inventor: Yasuo Taguchi, Kanagawa, Japan

[73] Assignee: Fuji Xerox Co., LTD, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/634,831

[22] Filed: Apr. 19, 1996

[30] Foreign Application Priority Data

Apr. 20, 1995 [JP] Japan ................................. 7-117729

[51] Int. Cl.[7] ............................................. G06T 3/00
[52] U.S. Cl. ................................ 707/527; 707/521
[58] Field of Search ............................. 395/779–784, 395/788, 789; 707/517–522, 526, 527; 345/121, 127

[56] References Cited

U.S. PATENT DOCUMENTS

| | | | |
|---|---|---|---|
| 4,754,428 | 6/1988 | Schultz et al. | 395/200.76 |
| 4,778,288 | 10/1988 | Nakamura | 400/76 |
| 5,029,114 | 7/1991 | Makiguchi | 395/139 |
| 5,210,622 | 5/1993 | Kelley et al. | 358/451 |
| 5,231,579 | 7/1993 | Tsuchiya et al. | 395/769 |
| 5,337,161 | 8/1994 | Hube | 358/448 |
| 5,608,541 | 3/1997 | Yamada | 358/448 |
| 5,644,682 | 7/1997 | Weinberger et al. | 395/101 |

FOREIGN PATENT DOCUMENTS 5-40594 2/1993 Japan .

OTHER PUBLICATIONS

"Okada et al., Beyond the Book Media: BookWindow", Journal of the Information Processing Society of Japan, 35(3):468–476 (1994).

*Primary Examiner*—Joseph H. Feild
*Attorney, Agent, or Firm*—Finnegan, Henderson, Farabow, Garrett & Dunner, L.L.P.

[57] ABSTRACT

A method and an apparatus for controlling output of a document associated with a tab, bookmark or similar edge-projecting object outputs the document in its complete form including the projecting object. In one aspect, a position calculator routine is executed to calculate the amount of deviation between an expanded area of the document including the projecting object and an output area of the output apparatus, a document shift processor routine adjusts the location of the to align it with the output area of the output apparatus, and the apparatus outputs the document in its adjusted location. In another aspect, an area size calculator routine calculates physical dimensions of the expanded area of the document, a reduction processor calculates a reduction ratio based on physical dimensions of the output area of the apparatus and those of the expanded document area, and the apparatus outputs the document after reducing its size in accordance with the reduction ratio.

7 Claims, 7 Drawing Sheets

METHOD AND APPARATUS FOR OUTPUTTING AN IMAGE OF A TABBED DOCUMENT

BACKGROUND OF THE INVENTION

1. Field of the Invention

This invention relates to a method and an apparatus for controlling output of a document associated with an electronically produced tab, bookmark or similar projecting object attached thereto when printing or displaying the document.

2. Description of the Related Art

Some conventional document processing systems using a personal computer, for instance, employ a technique of attaching electronically produced projecting tabs to a document based on a relationship established between document data and tab data, by the use of multi-window or other technology. Examples of such conventional techniques are disclosed in a paper titled "Beyond the Book Media: Book-Window" written by Okada and Matsushita (Journal of the Information Processing Society of Japan, March 1994, Vol. 35, No. 3) as well as in Japanese Patent Unexamined Publication No. Hei. 5-40594.

These conventional systems allow tabs to be attached to a document in such a way that they stick out from any side of the document boundary. A problem which exists in these systems is that a document furnished with projecting tabs may not properly be outputted on a printer or displayed on a screen.

As an example, if printer paper is set to the same size as the original document, the tabs attached to it do not fit into the paper size. In such case, projecting portions of the tabs will not be printed when the document is printed by the printer. When a tab is attached to the left or top edge of the document and the document is printed with its origin (or upper-left corner) aligned with the origin (or upper-left corner) of the printer paper according to common practice in printing, the projecting portion of the tab will not be printed even if a sufficiently large size of printer paper is used.

Another previous approach to furnishing a document with a commentary is to insert and print explanatory notes at the end of the document as shown in Microsoft WORD for Windows User's Guide of July 1994 ("Microsoft WORD for Windows" is a trademark for a word processing software product of Microsoft Corporation). This approach is associated with such a problem that the relationship between the explanatory notes and the body of the document is difficult to recognize.

Although there are known techniques of attaching tabs, bookmarks or similar projecting objects to a document as seen above, it has not been possible to print out the document in its complete form including the projecting portions of the attached objects. There has also been the possibility that the projecting portions of the objects attached to the document are not even displayed on the screen in certain cases.

OBJECTS AND SUMMARY OF THE INVENTION

The present invention has been made to overcome the aforementioned problems of the conventional system. Accordingly, it is an object of the invention to make it possible to print or display a document in its complete form including projecting portions of objects such as tabs that are attached to the document.

According to one aspect of the invention, there is provided a method for controlling output of a document associated with an object attached thereto with a portion of the object projecting outward beyond a boundary of the document. In a preferred embodiment, the method includes determining center positions of both an output area of an output device and an expanded area of the document which just includes the attached object, followed by determining the amount of deviation between the centers of the two areas, shifting the document based on the amount of deviation, and causing the output device to output the document with their centers in alignment.

According to another aspect of the invention, a further preferred embodiment employs a method including the steps of determining physical dimensions and positions of the origin points of both an output area of an output device and an expanded area of the document which includes the document and an object attached to the edge of the document, determining the amount of deviation between the origin points of the two areas as well as a reduction ratio based on a ratio between the physical dimensions of the two areas, shifting the document based on the amount of deviation, reducing the document in accordance with the reduction ratio, and causing the output device to output the reduced document with its origin point aligned with output area of the output device.

According to another aspect of the invention, there is provided an apparatus for outputting of a document associated with an object projecting from an edge portion thereof, the apparatus including an output device including a processor for executing control programs, a position calculator routine executed by said processor for calculating the amount of deviation between the center of an output area of the output device and the center of an expanded area of the document which includes the edge-attached object, and a document shift processor routine executed by said processor for adjusting the center position of the document by adding the calculated amount of deviation to the center coordinates of the document, wherein the output device outputs the document with the center of its expanded area exactly aligned with the center of the output area.

According to still another aspect of the invention, there is provided an apparatus for outputting of a document associated with an edge-attached object wherein the apparatus include an output device including a processor for executing control programs, an area size calculator for calculating physical dimensions of an expanded area of the document which just includes the attached object, a reduction processor routine executed by said processor for calculating a reduction ratio based on a ratio between physical dimensions of an output area of the output device and those of the expanded area of the document, a position calculator routine executed by said processor for calculating the amount of deviation between the origin of the output area of the output device and the origin of the expanded area of the document, and a document shift processor routine executed by said processor for adjusting the position of the origin of the document by adding the calculated amount of deviation to origin coordinates of the document, wherein the output device outputs the document with the origin of its expanded area exactly aligned with the origin of the output area and with the document size reduced in accordance with the calculated reduction ratio.

DETAILED DESCRIPTION OF THE PREFERRED EMBODIMENTS

Referring now to the accompanying drawings, specific embodiments of the invention will be described in the following, wherein a first embodiment is based on a relative shift method and a second embodiment is based on a reduction method.

Figure 1:
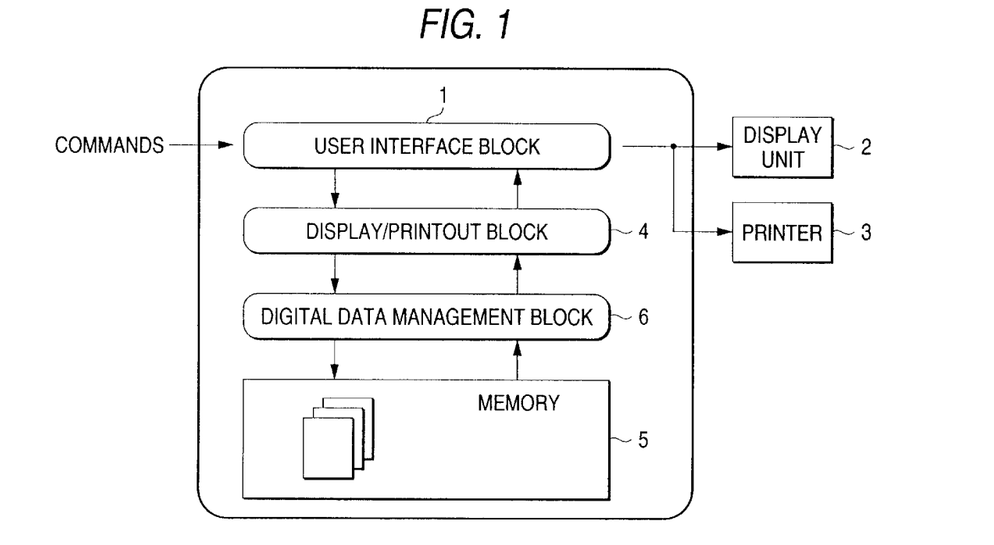
FIG. 1 is a block diagram showing the construction of an apparatus for controlling output of a document according to an embodiment of the invention.

Referring to FIG. 1, an apparatus for controlling output of a document according to the invention comprises a user interface block 1 for receiving commands entered via a mouse or a keyboard, for instance, a display unit 2 and a printer 3 for outputting the document, a display/printout block 4 including a processor for executing control software for controlling output of the document, a memory 5 for storing document data, and a digital data management block 6 for managing the document data stored in the memory 5.

Figure 2:
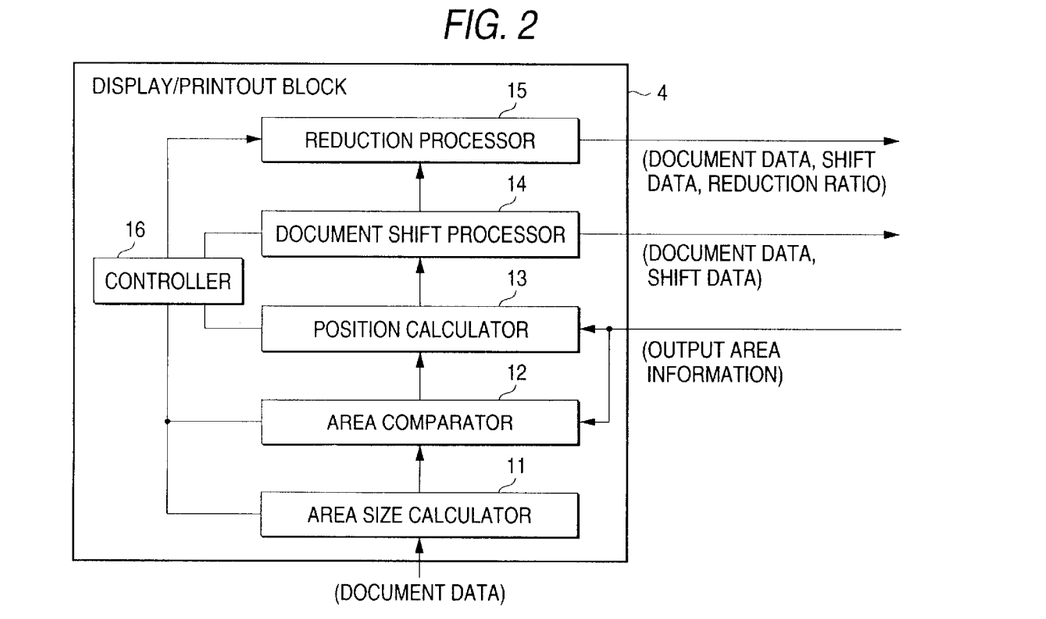
FIG. 2 is a block diagram showing the construction of the display/printout control position of an apparatus for outputting a document.

As shown in FIG. 2, the processor included in the block 4 implements an area size calculator routine 11 for calculating overall dimensions of a specified page whose area is expanded to include projecting portions of any tabs attached to the page based on the document data which contains tab data, an area comparator routine 12 for calculating a ratio between the size of an output area (or printing paper size) of the printer 3 and the size of the expanded area of the specified page based on a comparison thereof, a position calculator 13 for calculating center positions of both the output area of the printer 3 and the expanded area of the specified page as well as the amount of deviation between the centers of these areas, and a document shift processor routine 14 for shifting the center position of the specified page to compensate for its deviation based on the calculated amount of deviation. It is to be pointed out that the display/printout block 4 also implements a reduction processor routine 15 which will be used in the second embodiment to be described later.

The processor employed in the block 4 further executes a controller routine 16 which harmonizes operations of the aforementioned routines 11–15 of the display/printout block 4 for executing the document output control sequence.

The document data containing the tab data stored in the memory 5 is delivered to the area size calculator routine 11 by way of the digital data management block 6 while information on the output area is entered from the printer 3 to both the area comparator routine 12 and position calculator routine 13. The document shift processor routine 14 transmits shift data which pertains to the compensated center position of the specified page together with the document data containing the tab data to the printer 3.

The document output control sequence implemented by the display/printout processor of the thus constructed apparatus will be described referring to flowcharts.

Figure 3:
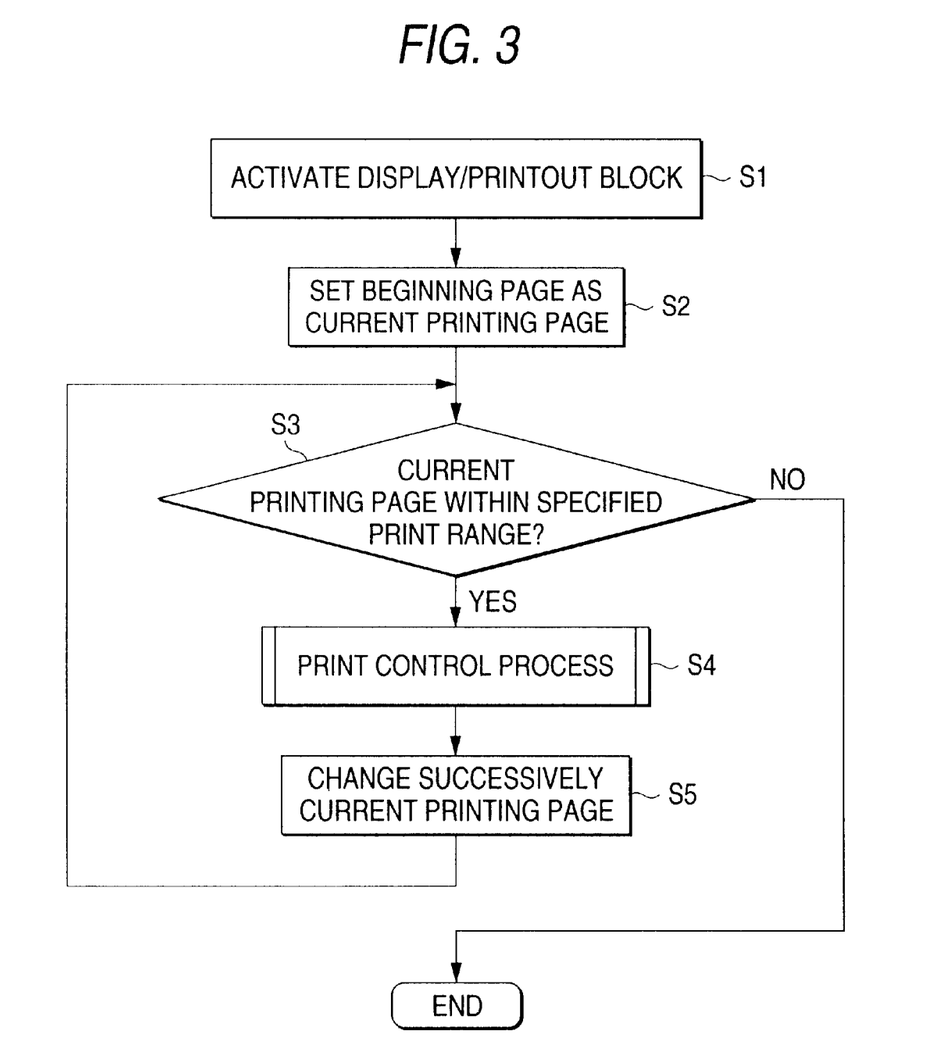
FIG. 3 is a functional flowchart schematically showing a main software routine of a document output control sequence used in the document output apparatus of the invention.

The flowchart of FIG. 3 shows a main software routine of the document output control sequence, according to which a document having projecting tabs attached to individual pages is printed out.

When a user enters a command for printing a tabbed document by specifying a paper size of the printer 3, a document file, a print range (or a range of pages of the document file), and the relative shift method, the command is transferred to the display/printout block 4 by way of the user interface block 1. At this point, the process of printing the tabbed document in the relative shift method is initiated (step S1).

When the display/printout processor in block 4 initiates the printing process, the controller routine 16 sets the beginning page of the specified print range as a current printing page (step S2). Controlled by the controller routine 16, the routines 11–14 are executed to perform the print control process (step S4). The current printing page is successively changed and the print control process is repeated until the ending page of the specified print range is printed out (steps S3, S5).

Figure 4:
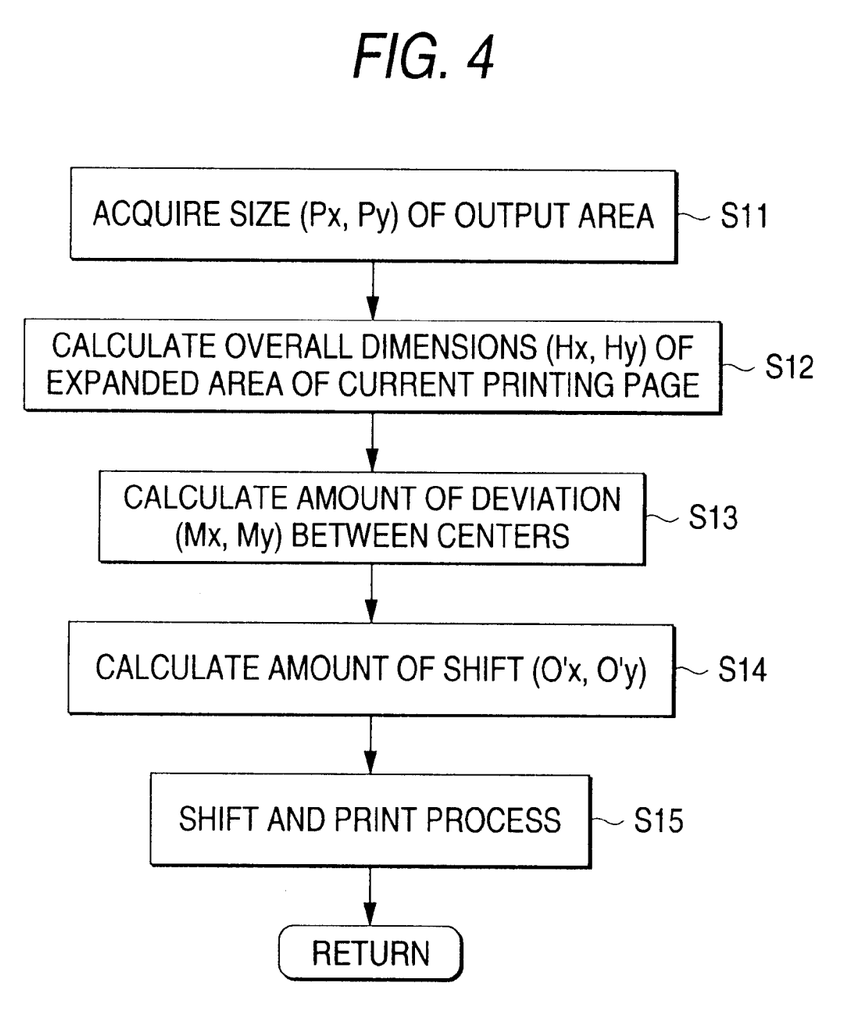
FIG. 4 is a functional flowchart schematically showing a a print control routine employing a relative shift method for outputting a document.

The print control process (step S4) is carried out in accordance with the flowchart shown in FIG. 4, whereby the center of an expanded area of each tabbed page is shifted exactly to the same position as the center of the output area of the printer 3.

Figure 5:
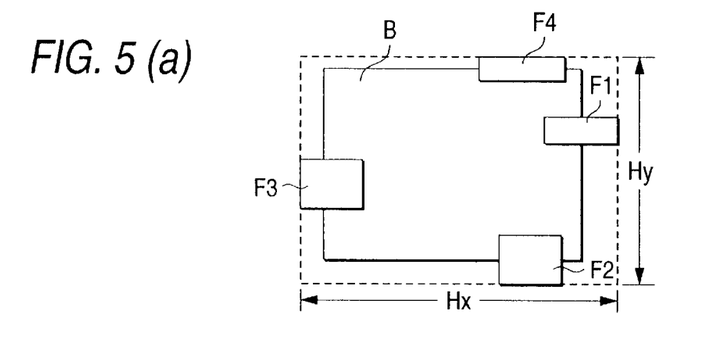
FIGS. 5(a)–5(c) are schematic diagrams graphically illustrating how the amount of shift is calculated in the routine of FIG. 4.

First, the area comparator routine 12 acquires data on the size (Px, Py) of the output area of the printer 3 corresponding to the specified paper size (step S11). The area size calculator routine 11 calculates overall dimensions (Hx, Hy) of the expanded area of the current printing page to which one or more tabs are attached (step S12). As an example, if tabs F1, F2, F3 and F4 are attached to current printing page B projecting from its four sides as shown in FIG. 5(a), overall horizontal and vertical dimensions (Hx, Hy) including the tabs attached to the current printing page B are calculated based on the document data read out from the memory 5.

From the dimensions (Px, Py) of the output area of the printer 3 and the dimensions (Hx, Hy) of the expanded area of the current printing page, the position calculator routine 13 first calculates the amount of deviation (Mx, My) between the centers of both areas in a situation where the two areas are aligned so that their upper-left corners are in exactly the same position (step S13). This deviation is the same as the deviation between the upper-left corners of the two areas when their centers are eventually matched as shown in FIG. 5(b) and, therefore, horizontal and vertical components of the deviation is Mx=(Px−Hx)/2 and My=(Py−Hy)/2, respectively.

From coordinates (Ox, Oy) of the origin (upper-left corner in this embodiment) of the current printing page B measured relative to the upper-left corner of its expanded area and the amount of deviation (Mx, My), the document shift processor routine 14 calculates the amount of shift (O'x, O'y) which will cause the center of the expanded area of the current printing page B to coincide exactly with the center of the output area (step S14). Specifically, horizontal and vertical components of the amount of shift are given by O'x=Mx+Ox and O'y=My+Oy as shown in FIG. 5(c).

When the document data for the current printing page is sent to the printer 3 together with data on the amount of shift obtained in step S14, the printer 3 moves the print position of the current printing page B by the specified amount of shift (O'x, O'y) and print it out (step S15). In this shift and print process of the first embodiment, the current printing page B excluding the tabs are shifted by the amount of shift (O'x, O'y) and printed, and the individual tabs attached to the current printing page B are successively shifted by the same amount (O'x, O'y) and printed.

Figure 6:
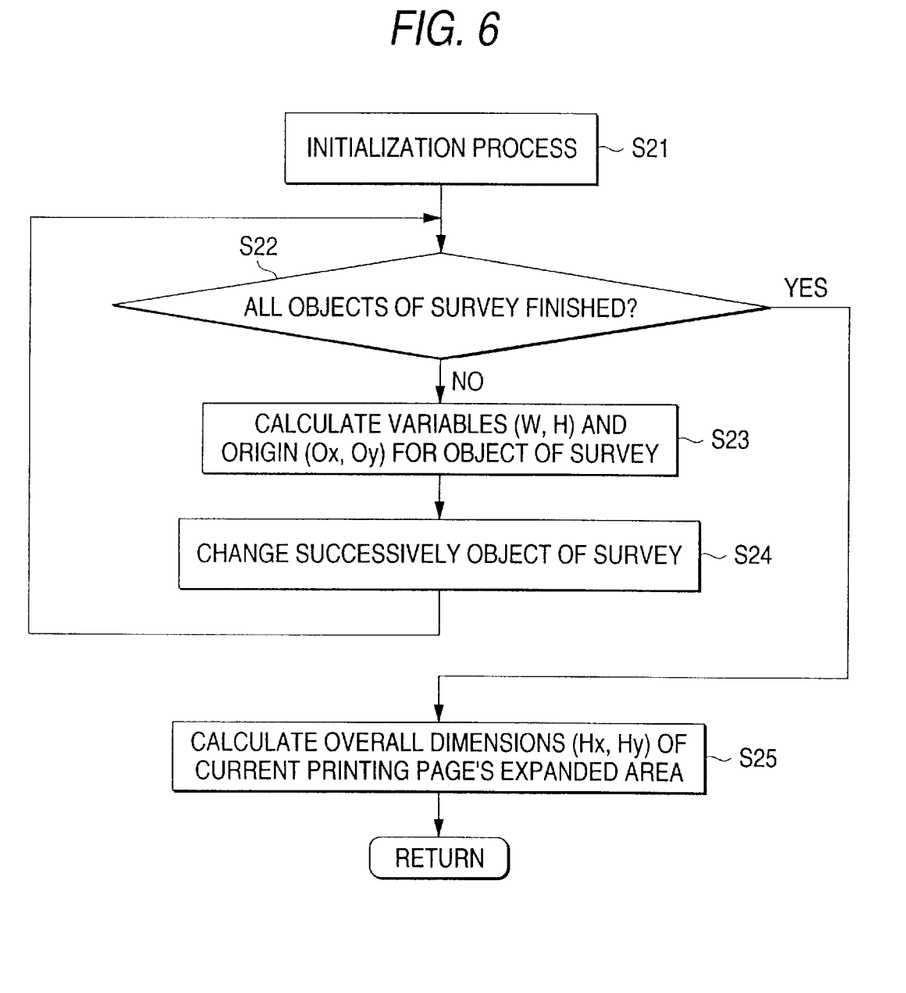
FIG. 6 is a functional flowchart for a software routine implementing a procedure for calculating overall dimensions of a page to be outputted whose area is expanded to include projecting portions of any tabs attached to the page.

FIG. 6 shows the detailed procedure of step S12 above, in which the overall dimensions (Hx, Hy) of the current printing page's expanded area are calculated. In this procedure, if a plurality of tabs are attached to the current printing page, the area size calculator 11 sequentially calculates overall dimensions (Hx, Hy) of the current printing page's expanded area for each tab as will be discussed in detail below.

In an initialization process, variables W and H representing the width and height of the current printing page are set to its original width and height, respectively, excluding any tabs attached thereto; origin coordinates (Ox, Oy) of the current printing page excluding the tabs are set to (0, 0); and one of the tabs is selected as an object of survey (step S21).

The area size calculator routine 11 executes an area calculating sequence (steps S23, S24) for one tab after another. When this sequence has been finished for all the tabs (step S22), the area size calculator 11 calculates the overall dimensions (Hx, Hy) of the current printing page's expanded area from accumulated values of the variables W and H as well as Ox and Oy (step S25).

Figure 7:
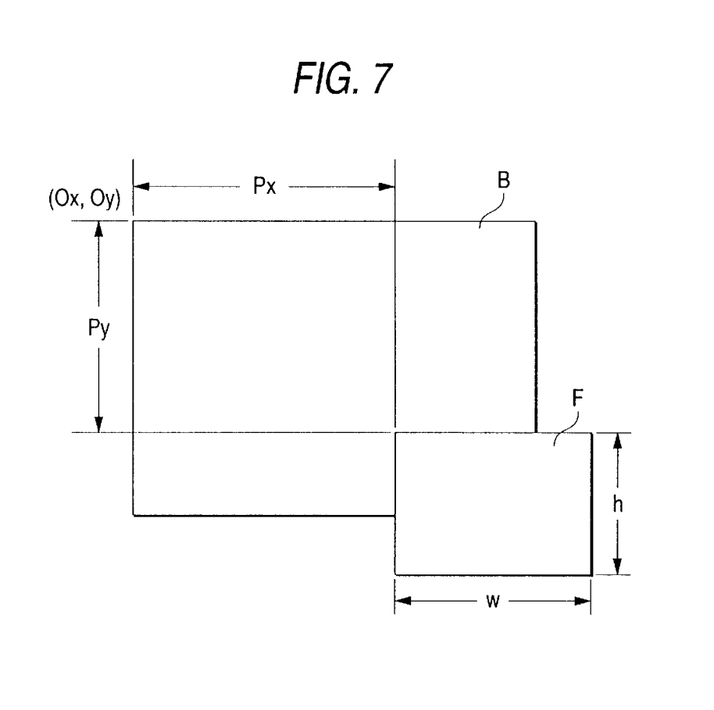
FIG. 7 is a schematic diagram illustrating how the overall dimensions of the page to be outputted are calculated in the routine of FIG. 6.

More particularly, values of the variables W and H and origin coordinates (Ox, Oy) are calculated for each tab selected as an object of survey (step S23). Horizontal and vertical dimensions (w, h) of a currently surveyed tab are added to horizontal and vertical components (Px, Py) of the distance between the origin of the current printing page B and the upper-left corner of the tab, respectively, as shown in FIG. 7. The sum Px+w is compared with the current value of the variable W and if the former is larger than the latter, the variable W is changed to Px+w. Similarly, the sum Py+h is compared with the current value of the variable H and if the former is larger than the latter, the variable H is changed to Py+h. Thus, the values of the variables W and H are obtained by W=max(W, (Px+w)) and H=max(H, (Py+h)), respectively. Also, the origin coordinates (Ox, Oy) are updated to take the current coordinates (Ox, Oy) or (–Px, –Py), whichever is the greater. Therefore, the values of Ox and Oy are given by Ox=max(Ox, –Px) and Oy=max(Oy, –Py), respectively.

The above calculation is repeated by changing the selection of the object of survey from one tab after another (step S24). The overall dimensions (Hx, Hy) of the current printing page's expanded area are calculated from accumulated values of the variables W and H as well as Ox and Oy using equations Hx=Ox+W and Hy=Oy+H (step S25).

To summarize, data on overall dimensions of individual areas, each containing a tab chosen as an object of survey, are accumulated and when this sequence has been finished for all the tabs, the overall dimensions of the current printing page B whose area has been expanded to include all the tabs are determined.

Figure 8:
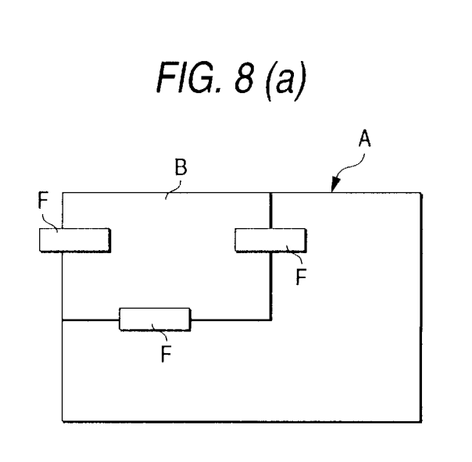
FIGS. 8(a)–8(b) are diagrams illustrating how the page to be printed is shifted through execution of the routine employing the relative shift method.

Referring to FIG. 8(a), even when the printing paper (output area A) of the printer 3 is sufficiently large, tabs F attached to the current printing page B may protrude from the output area A if the origin of the current printing page B is simply matched with the origin of the output area A. According to the above-described embodiment, the current printing page B is shifted so that the center of its expanded area coincides with the center of the output area A as shown in FIG. 8(b). As a result, the current printing page B including any projecting portions of the tabs F would fall within the output area A when printed. By shifting the print position to match the center of each page's expanded area with the center of the output area A in this manner, the printer 3 prints out individual pages with uniform widths of margin along the edges of the printing paper (output area A), eventually producing a consistently formatted printouts of the document.

Figure 9:
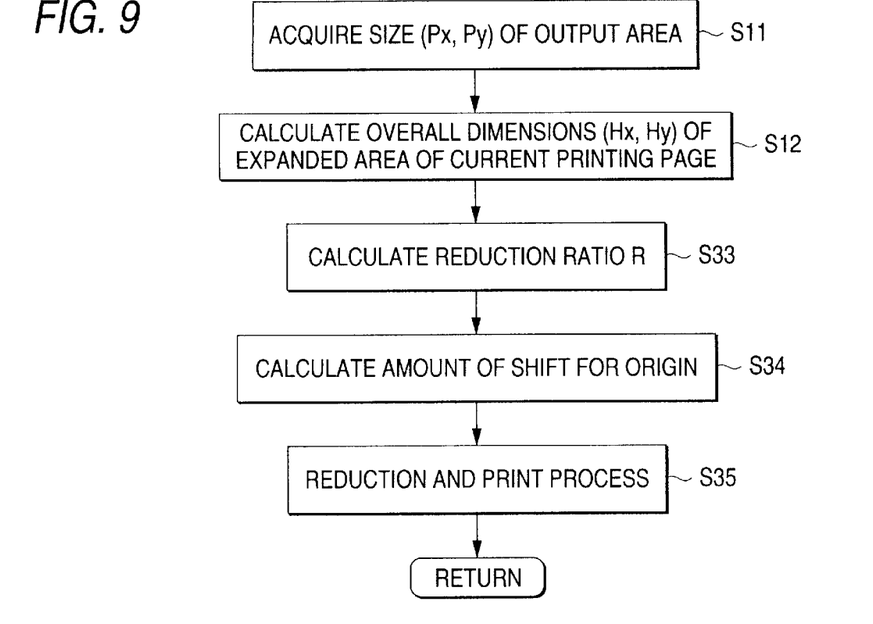
FIG. 9 is a functional flowchart illustrating of a print control routine implementing a document reduction method.
Figure 10:
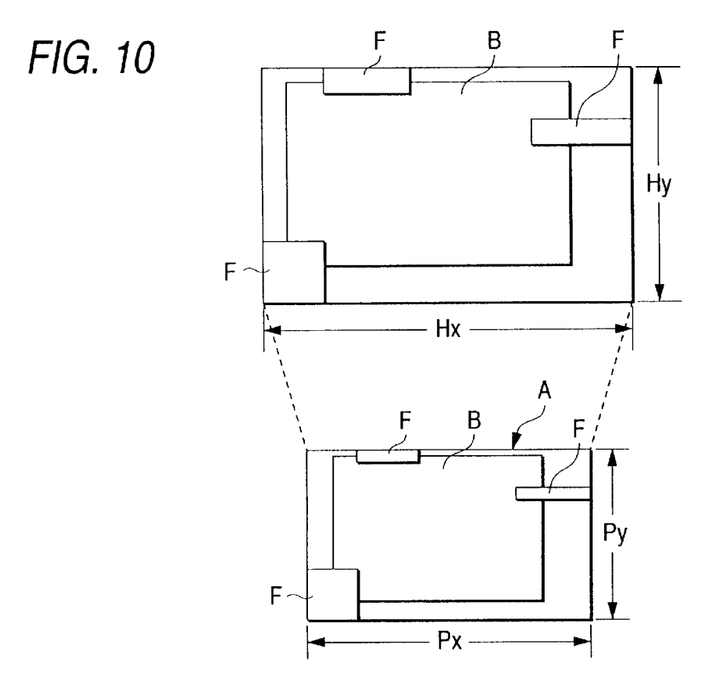
FIG. 10 is a schematic diagram illustrating how a page to be outputted is reduced through the reduction method implemented by the routine of FIG. 9.

FIGS. 9 and 10 show a document output control sequence performed by the second embodiment which is based on the reduction method. An apparatus for controlling output of a document according to this embodiment is slightly modified from that of FIG. 1 especially in that utilizes the reduction processor routine 15 for calculating a reduction ratio R based on the ratio between the size (Px, Py) of the output area of the printer 3 and the size (Hx, Hy) of the expanded area of a current printing page of the document. In this embodiment, the position calculator 13 calculates origin coordinates of both the output area of the printer 3 and the expanded area of the current printing page as well as the amount of deviation between the origins of these areas, and the document shift processor 14 shifts the origin of the expanded area of the current printing page to compensate for its deviation based on the calculated amount of deviation.

The reduction processor 15 transmits shift data which pertains to the compensated position of the origin of the current printing page's expanded area and the reduction ratio R in addition to the document data containing the tab data to the printer 3.

Although the apparatus of this embodiment prints out the document in accordance with the same main routine as shown in FIG. 3, its print control process (step S4) is slightly different from what is shown in FIG. 4. In addition, the user is required to specify a paper size of the printer 3, a document file, a print range (or a range of pages of the document file), and the reduction method for causing the display/printout block 4 to initiate a process of printing a tabbed document (step S1).

In the reduction method, the print control process (step S4) is executed in accordance with the flowchart shown in FIG. 9. The area comparator routine 12 acquires dimensions (Px, Py) of the output area of the printer 3 (step S1) and the area size calculator routine 11 calculates overall dimensions (Hx, Hy) of the expanded area of the current printing page (step S12) in the same way as described with reference to FIG. 4.

Based on a comparison of dimensions between these areas, the reduction processor routine 15 calculates the reduction ratio R (step S33) and the document shift processor routine 14 calculates the amount of shift which will cause the origin (upper-left corner in this embodiment) of the expanded area of the current printing page to coincide exactly with the origin (upper-left corner in this embodiment) of the output area of the printer 3 (step S34). In obtaining the reduction ratio R, the document shift processor routine 14 calculates a horizontal reduction ratio Rx=Px/Hx and a vertical reduction ratio Ry=Py/Hy for the current printing page and selects whichever is the smaller (which will result in a greater extent of reduction) as the reduction ratio R. Thus, the reduction ratio R is given by R=min(Rx, Ry).

When the shift data, the reduction ratio R and the document data for the current printing page are transmitted to the printer 3, the printer 3 shifts the current printing page by the specified amount of shift to adjust the location of its origin and prints out the current printing page reduced in accordance with the reduction ratio R (step S35).

Referring to FIG. 10, in a case where the printing paper (output area A) of the printer 3 is smaller than the expanded area of the current printing page B, tabs F attached thereto will protrude from the output area A if the page is printed without any preprocessing. In this embodiment, the current printing page B and the tabs F are reduced before they are printed by multiplying the reduction ratio R no matter which edges of the current printing page B the tabs F are attached to. As a result, the current printing page B and the tabs F fit together into the output area A of the printer 3 when printed.

If the output area A of the printer 3 is larger than the expanded area of the current printing page B, the reduction ratio R will become 1 or more. In this case, the current printing page B and the tabs F are enlarged together when printed and, therefore, the whole area of the printing paper of the printer 3 can be used effectively.

This embodiment may be modified in such a manner that each page to be printed is shifted in its original size and only tabs attached thereto are reduced so that their projecting potions will fit into blank space created around the page by shifting its origin.

Although the above embodiments require the user to alternatively specify the relative shift method or reduction method, it is possible to modify them in such a manner that if a particular page can not be printed together with tabs attached thereto even by using the relative shift method, the apparatus is automatically switched to the reduction method based on the result of comparison between the sizes of the output area of the printer 3 and the expanded area of the page in question.

Although the above embodiments are constructed to control output of each page so that all tabs attached thereto are printed, it is possible to modify them in such a manner that individual tabs are provided with certain attributes which determine whether or not to print the individual tabs or indicate their priority, whereby only those tabs of which attributes meet predefined criteria are printed.

While the above embodiments have been described with particular reference to tabs projectingly attached to a document, the invention is not limited to any specific form of objects but is applicable to handling of a document associated with bookmarks or similar projecting objects that can be attached thereto.

Furthermore, while the foregoing description of the specific embodiments has been limited to a discussion of the methods and apparatus for printing a document associated with projecting objects, the invention can be applied to on-screen presentation of such a document.

What is claimed is:

1. A method for controlling output of an image of a document having an object extending beyond an edge thereof, said method comprising the steps of:

forming an image of a document having an object extending beyond an edge thereof;

determining the center position of an expanded area of the document image which includes the object;

determining the amount of deviation between the center of the expanded area of the document image and the center of an output area of an output device;

shifting the document image based on the amount of said deviation to align the centers of the two areas; and causing the output device to output the document image with said centers in alignment.

2. A method for controlling output of an image of a document having an object extending beyond an edge thereof, said method comprising the steps of:

forming an image of a document having an object extending beyond an edge thereof;

determining the physical dimensions and position of the origins point of an expanded area of the document image which includes the object;

determining the amount of deviation between the origin point of the expanded area of the document image and the origin point of an output area of an output device as well as a reduction ratio based on a ratio between the physical dimensions of the two areas;

shifting the document image based on the amount of said deviation to align said origin points;

reducing the document image in accordance with the reduction ratio; and causing the output device to output the reduced document image with its origin point aligned with the origin point or the output area of the output device.

3. An apparatus for controlling output of an image of a document having an object extending beyond an edge thereof, said apparatus comprising:

an input device forming an image of a document having an object extending beyond an edge thereof;

an output device including a processor for executing control programs;

a position calculator routine executed by said processor for calculating the amount of deviation between the center of an output area of the output device and the center of an expanded area of the document image which includes the object; and a document shift processor routine executed by said processor for adjusting the center position of the document image by adding the calculated amount of said deviation to the center coordinates of the document, wherein the output device outputs the document image with the center of its expanded area exactly aligned with the center of the output area.

4. The apparatus according to claim 3, wherein said position calculator routine finds the expanded area of the document image based on the document and the object whose attribute satisfies a predetermined reference.

5. An apparatus for controlling output of an image of a document having an object extending beyond an edge thereof, said apparatus comprising:

an input device forming an image of a document having an object extending beyond an edge thereof;

an output device including a processor for executing control programs;

an area size calculator routine executed by said processor for calculating physical dimensions of an expanded area of the document image which includes the object;

a reduction processor routine executed by said processor for calculating a reduction ratio based on a ratio between physical dimensions of an output area of the output device and those of the expanded area of the document image;

a position calculator routine executed by said processor for calculating the amount of deviation between the origin point of the output area of the output device and the origin point of the expanded area of the document image; and a document shift processor routine executed by said processor for adjusting the position of the origin point of the document image by adding the calculated amount of deviation to the origin coordinates of the document image, wherein the output device outputs the document image with the origin point of its expanded area aligned with the origin point of the output area of the output device and with the document image size reduced in accordance with the calculated reduction ratio.

6. The apparatus according to claim 5, wherein said reduction processor routine sets the reduction ratio to be one when the physical dimensions of the expanded area of the document image are smaller than those of the output area of the output device.

7. The apparatus according to claim 5, wherein said position calculator routine finds the expanded area of the document image based on the document and the object whose attribute satisfies a predetermined reference.

* * * * *